US006936215B1

(12) United States Patent
Price et al.

(10) Patent No.: US 6,936,215 B1
(45) Date of Patent: Aug. 30, 2005

(54) PROCESSING METHODOLOGY FOR THE RATIONAL CONTROL OF BILAYER NUMBERS LEADING TO HIGH EFFICIENCY PRODUCTION OF LIPID MICROTUBULES

(75) Inventors: Ronald R. Price, Stevenville, MD (US); Joel M. Schnur, Burke, VA (US); Banahalli R. Ratna, Springfield, VA (US); Mark S. Spector, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 08/703,608

(22) Filed: Aug. 27, 1996

(51) Int. Cl.[7] .............................................. B01J 13/00
(52) U.S. Cl. ........................................ 264/349; 558/87
(58) Field of Search ........................... 264/349; 558/87

(56) References Cited

U.S. PATENT DOCUMENTS 4,877,501 A * 10/1989 Schnur et al. ......... 204/157.64
5,492,696 A * 2/1996 Price et al. ................. 424/417
5,705,191 A * 1/1998 Price et al. ................. 424/473
6,013,206 A * 1/2000 Price et al. .................. 264/4.1

OTHER PUBLICATIONS

Nounesis et al. "Melting of phospholipid tubules", Phys. Rev. Lett. 76(19), p. 3650-3653, May 1996.*
Splunt et al., Phys. Rev. E : Stat. Phys., Plasmas, Fluids, Relat. Interdiscip. Top. 48(1) p 328-339, 1993.*

* cited by examiner

*Primary Examiner*—Jeffrey Mullis
(74) *Attorney, Agent, or Firm*—John J. Karasek; Amy Ressing

(57) ABSTRACT

The wall thickness of lipid microtubules are controlled by selecting a methanol/water system and determining the required amount of a lipid to form the desired wall thickness. The lipid is dissolved in a small portion of the heated methanol and that clear solution is added to the remaining amount of the heated methanol/water system. By slowly cooling the solution, microtubules are formed which have the desired wall thickness. Preferred microtubules have a wall thickness of just 2 bilayers and they are robust so they can be further coated. They can be made with a large aspect ratio and with lengths of greater than 250 microns. The process permits production of microtubules in very high yields.

21 Claims, 1 Drawing Sheet

PROCESSING METHODOLOGY FOR THE RATIONAL CONTROL OF BILAYER NUMBERS LEADING TO HIGH EFFICIENCY PRODUCTION OF LIPID MICROTUBULES

BACKGROUND OF THE INVENTION

1. Field of the Invention

This invention relates to the formation of microcylinders or microtubules from phospholipids with the rational control of wall thickness (i.e. the number of bilayers) of microcylinders.

2. Description of the Previously Published Art

Multibilayer lipid microstructures have been made by cooling from multilamellar liposomes in water, and from solutions of ethanol and other alcohols. The resulting multibilayer tubules have typically a broad distribution of bilayers with a median of about 10 bilayers. Single bilayer tubules have been prepared by cooling from solutions of water and methanol. Single bilayer tubules, however, are extremely fragile.

U.S. Pat. No. 4,990,291 discloses forming lipid microcylinders from a thermal cycling process in what is basically a lipid/water system. After purification and drying of a diacetylenic phospholipid the tubule is formed by first hydrating the lipid at about 10° C. above its endothermic transition point. Then the lipid mixture is cooled slowly at a rate not to exceed 1° C. per minute, preferably not greater than 0.5° C. per min to a formation temperature 1° to 10° below the lipids' exothermic transition temperature also known as the gel phase transition. The solution is held at the formation temperature for between 30 minutes and 2 hours, most preferably 1 hour. Once the tubule structures are formed they are stable as long as the tubule structures are not heated above the endothermic transition temperature. If desired, the tubule structures can be polymerized by any of the well-known means to a permanent tubule form. The tubules formed are usually extremely straight hollow cylinders of approximately 0.5 micrometer diameter and 5 to 100 micrometers in length. These tubules can be used in a vast variety of ways. The tubules can be used to hold materials in a manner well known for lipid vesicles described in the patent. In addition, the tubules can be coated with metals as described in U.S. Pat. No. 4,911,981. This U.S. Pat. No. 4,990,291 patent does not use methanol or methanol/water solutions, or describe any process of crystallization from a mixed alcohol water system.

U.S. Pat. No. 4,887,501 discloses forming lipid microstructure from a mixed solvent system to produce helix or cylinder microstructures. The first step is to add a lipid to a lipid solvating organic solvent. Then a predetermined amount of water is added to the solvent/lipid mixture and the solution is allowed to sit for a predetermined amount of time and at a predetermined temperature. The temperature is preferably maintained about 10–30° C. below the melting point of the lipid as defined in excess water. A broad range of solvents are disclosed and the concentration of the lipid in the organic solvent lipid solution is typically preselected to be less than about 2 mg/ml.

The most preferred organic solvents are relatively polar organic solvents such as tetrahydrofuran, chloroform, and alcohols and polyols, such as methanol, ethanol, propanol, isopropanol, butanol, isobutanol, propylene glycol, ethylene glycol and mixtures of these. In the 14 examples the only alcohols used are ethanol and isopropanol. There is no discussion of the number of bilayers in the tubule wall. In Example 4 the diameters range from 0.2 to 3.0 microns. This reference does not describe a method to yield a uniform microtubule dispersion at high yield. It also does not teach rational control of bilayer numbers or any method of obtaining the same. The lipid is first dissolved in the solvent and then the water added. When practiced as described, the direct result of the addition of water is the immediate formation of lipid structures from the dissolved lipid in the presence of local concentrations of water. This leads to a very large number of liposomes, bilayer ribbons and sheets as well as micelles formed in addition to the desired microtubules. Such materials degrade the sample, decrease the yield of microtubules and thus diminish the degree of control that may otherwise be realized.

U.S. Pat. No. 4,887,501 further teaches that a range of bilayers resulted from formation in a mixed solvent system, and that variation in the solvent concentrations as well as the concentration of the lipid in relation to the mixed solvent had little effect on the number of bilayers, and that in contrast the number of bilayers were effected to a greater extent by the hydrocarbon chain length in the lipids used to form the microtubules.

To date the yield and morphology of the microtubules has been difficult to reproduce on a rational basis, and especially conversion rates have been poor. This problem exists in both systems of thermal cycling and mixed solvents. It is almost impossible to obtain conversion rates that are economically viable with thermal cycling, and in addition there is no correlation between concentration and aspect ratio or yield. Further the presence of a very large number of non-cylindrical lipid structures makes it very difficult if not impossible to process the resultant structures into a homogenous cylindrical product. In the solvent methodology it is imperative that thermal and chemical mixing (including the heat of mixing of the alcohol and water) be minimized. Any mixing once the tubules have formed leads to differential shear and thus mechanical disruption of the high aspect ratio microcylinders and also leads to birdnesting which can be thought of as a tubule logjam. Such inconsistent morphology results in microcylinders which may vary from 4 to 20 or more bilayers in a single batch. The inner diameters remain about 0.5 microns with the outer diameters varying as a result of the number of bilayers.

These multiple-walled cylinders have the further problem that the yield (and thus the costs) of actual microcylinders from an initial concentration of lipid may be up to 500% lower than if the same amount of lipid was used to form microcylinders with a fixed, lower number of bilayers such as a double bilayer wall per structure.

Although one might desire to make smaller tubules from an economic point of view, the literature does not teach one how this can be done and especially how it can be done efficiently. It also does not teach the minimum number of bilayers that are needed for a strong product.

B. R. Ratna et al in "Effect of alcohol chain length on tubule formation in 1,2-bis(10,12-tricosadiynol)-sn-glycero-3-phosphocholine," Chem. Phy. Lipids. 63, 47 (1992) studied the volume fractions of alcohols from which tubule formation was observed. For the methanol/water system they found the range to be 65/25–90/10. For lower fractions the lipid precipitates out in an amorphous form whereas on the higher alcohol side of the window, the lipid remains in solution even at room temperature. The authors also measured the number of bilayers in the tubules grown from different alcohols. They found the number of bilayers constituting the wall of the tubule is independent of the alcohol/water ratio. However, the number is found to be strongly dependent on the chain length of the alcohol. They studied methanol, ethanol and 1-propanol. For methanol and using an 85/15 methanol/water system, 95% of the tubules grown were made of a single bilayer and the remaining 5% being made from two or three bilayers. There is no teaching that the number of bilayers could be controlled at two to form a more robust structure, and in fact teaches away from utilization of methanol to make multi-layered structures. The paper clearly indicates that there is no way using its reaction conditions that more than one bilayer tubules can be formed from methanol-water solutions. When the alcohol was changed to ethanol or 1-propanol the wall thickness as well as its variance increase considerable. Samples grown in both of these longer chain solvents have an average of 6–7 bilayers with a standard deviation of 3 bilayers. Thus the literature has taught that a methanol/water system basically produces a microtubule with a wall having only a single bilayer.

These tubules produced from methanol, however, which normally have the single bilayer break very easily and can not be used for metalization and subsequent commercial applications.

G. Nounesis et al in "Melting of Phospholipid Tubules," Phy. Rev. Lett. 76, 3650 (1996) describe the morphological transformations and the bilayer phase transformation of $DC_{8,9}$GPC tubules in methanol/water solutions. They note that at a lipid concentration, ρ, less than 2 $mg/cm^3$ the majority, ~95%, of the tubules formed have single bilayer walls. With $\rho>4$ $mg/cm^3$,—most of the tubules have from two to four bilayers in the walls. This discussion illustrates the common knowledge that the wall produced in methanol/water system is generally a single bilayer. Although at a higher lipid concentration wall is produced having more than a single bilayer, there is no suggestion that just a two bilayer can be produced since they report that the microtubules have from 2 to 4 bilayers.

Previous work with ethanol/water systems in both thermal cycling process and the mixed solvent system has indicated that the median number of bilayers in any population of microcylinders is about 10, and many have been observed having up to 20 or more. For the case of the smallest median wall size of approximately 10 bilayers for the ethanol system, the number of microstructures that could possibly form is reduced by at least 500% at a minimum over a more desired system where the average wall size is only two bilayers.

3. Objects of the Invention

It is an object of this invention to provide for the rational control of the number of lipid bilayers that comprise lipid microstructures such as lipid tubules.

It is a further object of this invention to provide the formation of robust microtubules which can be processed for further treatment without disruption of the microstructure.

It is a further object of this invention to provide lipid microstructures which have greater than a single bilayer microtubule so that they will be sufficiently robust to allow for continued processing such as metallization, inclusion in polymer or ceramic matrixes, or exposed to in vivo as well as in vitro environments.

It is a further object of this invention to provide lipid microstructures which have just two bilayers so as to form robust tubules with the minimum amount of lipid material.

It is a further object of this invention to form lipid microstructures with an aspect ratio of the tubules which is greater obtained than from previous methods.

It is a further object of this invention to form lipid microstructures having a much narrower range of diameters, due to the regularity of the number of bilayers.

It is a further object of this invention to provide for a process for the rational control of the number of lipid bilayers comprising the walls of microcylinders.

It is a further object of this invention to provide a process to produce lipid microstructures which have greater than a single bilayer microtubule so that they will be sufficiently robust to allow for continued processing.

It is a further object of this invention to form robust lipid microstructures where the number of bilayers is less than in other methods yet at least two bilayers so there are more individual tubules formed from the same weight of lipid.

It is a further object of this invention to increase the yield of individual lipid microstructure from a initial concentration of lipid monomer.

It is a further object of this invention to provide a substantial cost reduction in the process of forming lipid microstructures due to the use of more efficient production with increased overall yield.

It is a further object of this invention to provide greater conversion of lipid to microcylinders such that the yield is >90% conversion.

It is a further object of this invention to provide the ability to control the number of bilayers when forming lipid microstructures to be within a narrow range.

It is a further object of this invention to provide a process to make lipid microcylinders of predetermined morphology from a mixed methanol/water system.

It is a further object of this invention to provide a means of thermally cycling a lipid/solvent system whereby the aspect ratio of the microcylinders may be controlled.

It is an object of this invention to provide a method in which microcylinders formed from lipids may be produced in bulk by a rational process, whereby the number of lipid bilayers that comprise lipid microcylinders may be predetermined to the optimum number of two, with a conversion rate of >98% of the lipid utilized, thus offering a very large increase in the numbers of such structures per volume of lipid and alcohol, and thus reducing costs up to 100 to 500%.

These and further objects of the invention will become apparent as the description of the invention proceeds.

SUMMARY OF THE INVENTION

The present invention relates to a method for controlling the wall thickness of lipid microtubules formed by cooling a heated methanol-water mixture containing the dissolved lipid. The first step is select a methanol-water system to be used which is characterized by a volume ratio of methanol and water that totals 100 volume percent. Next the amount of lipid to be used is determined based on the solvent system selected in the first step so as to produce the desired wall thickness of the microtubule. That determined amount of lipid is then dissolved into a portion of the methanol which has been heated to a temperature above the transition temperature for the lipid to form a clear solution. This heated clear solution is then added to a mixture of the remaining methanol and water as selected in the first step which has been heated to a comparable temperature above the transition temperature for the lipid. Thus the total amount of methanol and water is in the desired ratio amount selected in the first step. This solution is finally allowed to cool slowly to permit the formation of microtubules with a controlled, uniform number of bilayers.

This process permits the production of unique populations of tubules where the population of lipid microtubules can have from 70% to greater than 95% of the tubules having a wall thickness of just two bilayers. Similar control can be had with the median length of the tubules so that populations can be made which vary from over 50 microns to over 250 microns in length. The tubules with just two bilayers are robust and can be coated with a large variety of coatings.

DESCRIPTION OF THE PREFERRED EMBODIMENTS

Figure 1:
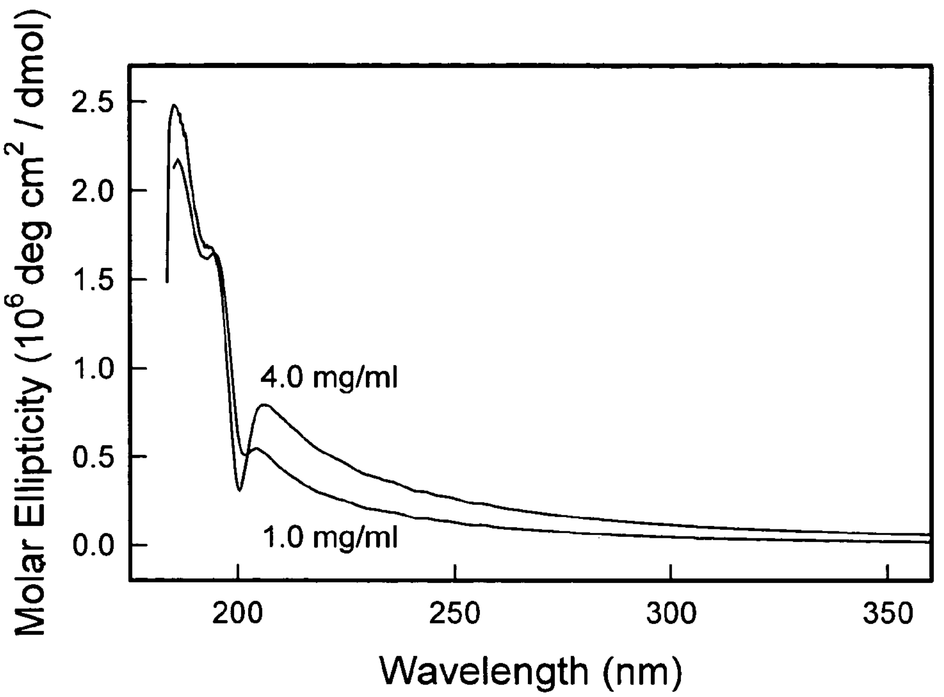
FIG. 1 is a graph showing concentration dependence of the CD spectra of $DC_{8,9}PC$ tubules in methanol/water (7:3) at 25° C.

The instant invention relates to the efficient production of an engineered biochemical product (microtubules) in such a way that the number of bilayers in an individual microcylinder and thus control of the diameter and aspect ratio of the resulting structures may be predetermined in a rational and repeatable manner. Control of the wall thickness allows for an increase in the numbers of microcylinders that may be produced from a selected quantity of lipid as opposed to having no rational control of the process and subsequent poor yield with respect to the number of structures formed from a defined solvent system at a specified lipid concentration. This is absolutely imperative with systems where the physical characteristics must be defined, within a narrow tolerance range.

A surprising result not previously reported in the patent or scientific literature is that by utilization of specific alcohol water solvent mixing ratios with narrowly defined concentrations of lipid it is possible to increase the yield of the formation process up to 500% and to provide an extremely narrow distribution of bilayer numbers permitting rational control of the chemical engineering parameters necessary to scale up lipid microcylinder production for economically viable production of a defined product.

The production of microcylinders of predetermined bilayer numbers at high yield has not been described in the literature, and in fact, the published methods point to the alcohol chain length being the dominating factor as seen in the Chem. Phy. Lipids (1992) article by B. R. Ratna et al cited above.

In an especially preferred embodiment, a mixed alcohol/water bath is utilized such that the alcohol is methanol blended with water at the volume ratio of 85:15 methanol to water. The methanol and water should preferably first be filtered to remove any particulate material. The formation method includes the addition of a known microcylinder forming polymerizable lipids such as lecithin at a concentration of about 5 mg/ml such that 15 parts methanol by volume and 3 parts water by volume are blended and warmed to a point at least 5° C. greater than the lipids chain melting transition temperature in the solvent system of choice. As an example, with the lipid 1,2 bis(tricosa-10,12-diynoyl)-sn-glycero-3-phosphocholine ($DC_{8,9}PC$) the temperature would be a minimum of 45° C., but not sufficiently high to cause chemical degradation of the lipid. For a discussion of lipid nomenclature and structures, see U.S. Pat. Nos. 4,877,501 and 5,290,690 the entire contents of which are incorporated herein by reference.

A further two parts by volume of the alcohol (methanol) is heated as above and an amount of the lipid is added sufficient to provide a concentration of 5 mg/ml in the final formation bath is added. This is agitated until all of the material is observed to have been fully solvated.

Following this step the mixture is then filtered using a 0.22 micron filter to remove any particulate and bacteria, and the resultant solution is then added to the alcohol water bath. This important step will eliminate any particulates that might become foci for unwanted lipid deposition and removal of microbes that would contaminate the final tubule suspension.

This is mixed until uniform and the entire system is then cooled to just below the transition temperature of 32° C. at a rate not to exceed 1° C. per hour, following which the microcylinders are observed to form. When the solution begins to become turbid the temperature is further lowered to 20° C. for a period of 72–144 hours.

The solution is then dialyzed against water to remove the alcohol and then against an HCl/water solution at pH 1.4 for a period of time sufficient to lower the pH of the tubules to 1.4. A 3% solution of a commercial palladium tin catalyst in a 0.1 M solution of HCl is introduced such that it is exactly 6 times the volume of the microcylinder suspension used. This addition is done gradually so as not to offer a catastrophic change in osmolarity within the microtubule suspension. This step is completed when the solution clears and the microcylinders have settled due to their increased density. Electroless plating is conducted according to the manufacturers recommendations. An example of such a process is given in Example 3.

Microtubules that are to be coated with a polysaccharide such as sodium alginate or chitosan glutimate are dialyzed against water to remove the methanol, diluted 10 times with a mixture of from 0.25% to 2.0% of a polysaccharide, following this dilution the suspension is very gently agitated by swirling to prevent settlement of the microstructures. The reaction is allowed to continue for up to 24 hours after which the tubules are separated by centrifugation or filtration and then re-suspended in water to remove all exogenous polysaccharide. The polysaccharide may be polymerized by crosslinking with calcium salts in the case of alginates or with an aldehyde or amine such as spermine as would be the case with the chitosan. Following coating the chitosan coated tubules may be further processed for electroless metal deposition just as the non coated microtubules would or they may be further decorated with a range of biochemically active materials.

Best results will be obtained by carefully controlling the process conditions.

It is very important that in order to obtain a uniform product of individual microcylinders of narrowly defined structure that the lipid be fully solvated in alcohol above the transition temperature, and that all remnants of impurities and non-soluble reaction products be removed.

Following this step the concentrated lipid solution is added to the majority volume of alcohol and water which has been mixed to a homogenous consistency and at a homogenous temperature. By avoiding any high concentrations of water or the chance of additions at a lower temperature sufficient to instantly form unwanted microstructures, a more controlled and regular product is produced at a higher yield. These unwanted microstructures might provide a foci for further precipitation of non-tubular structures and thereby reduce the yield.

Further, it is necessary that the mixture be very evenly mixed following addition of the lipid so that the dilution is uniform and that the final mixture is 85:15 throughout the mixture thus avoiding variation.

Addition of the water to the alcohol with no temperature control or protection from excess hydration will allow for precipitation of the lipid leading to an increase in non-tubular structures such as liposomes or bilayer ribbons or sheets in the final product, detracting from rational control of the final product.

Finally the rate of cooling is important to obtaining high aspect ratios and the absence of any unwanted structures. When formation occurs at a rapid rate there is a greater variability.

The utilization of an 85:15 v/v mixture of methanol and water and the utilization of a specific quantity of lipid (such as 5 mg/ml) results in the desired product formation for the particular lipid used in the examples. Lipid loadings in excess of this figure results in highly visco-elastic solutions that are difficult to process and which contain a large number of liposomes. Lesser amounts of lipid results in formation of single bilayer microtubules which are not sufficiently robust to allow for continued processing. For other lipid materials it is expected that loadings as low as 2 mg/ml will be acceptable as well as any larger amount.

It is also expected that for other lipids the volume ratio of methanol to water could vary from about 98:2 to 40:60.

At this time the lipids known to form microstructures in this manner include phospholipids with diacetylenic moieties in their acyl chains and having total carbon contents of C-15 to C-27. There may be others, but investigations on other acceptable materials have not yet been done.

A significant advantage of the present invention is the greater conversion of lipid to microcylinders such that the yield is greater than 90%, more preferably greater than 95% and most preferably greater than 98%.

Since the controlled number of bilayers is less than in other methods of formation, there are more individual tubules formed from the same weight of lipid. The ability to form just two bilayers is very important as it reduces the amount of lipid needed to form a single tubule which increases the number of tubules formed per gram of lipid. This leads to the production of tubules with approximately five times less lipid materials and these smaller walled tubules provide a 500% cost reduction in the formation of such tubules over previous methods. As costs of synthesis for tubule forming lipids is very high, a 5 fold increase in yield translates into a considerable cost savings. Further, reduced processing needs required to remove the unreacted lipid saves processing time and improves economy. Thus, the significant advantage of the present process is a substantial cost reduction that accrues from more efficient production and the increase in overall yield.

One major advantage is the ability to process these microtubules for further treatment without disruption of the microstructure. Previous attempts to process tubules formed in methanol had failed due to the fact that only single bilayers were formed in significant numbers and the methods utilized resulted in the microstructures being destroyed by the processing.

An unexpected result was the ability to control the number of bilayers within a narrow range during formation. This ability to control the number of bilayers is in direct conflict with previously patented and published results and was not expected prior to this invention. The inner diameter is regulated by both the initial exterior diameter during formation and the wall thickness. Since each bilayer has a thickness of approximately 8–10 nm, by controlling the number of bilayers at two, an average of 8 bilayers is eliminated which results in a considerable reduction in the outer diameter of up to 200 nm. It has been found that the ideal number of bilayers is two. This thickness provided sufficient strength for commercial applications with the optimal amount of lipid being used. By using this process the same amount of lipid will produce 5 times more tubules. This will reduce the cost of the required lipid for a particular application by 500%.

In addition the aspect ratio, which is the ratio of the length to the width, of the tubules is greater than from previous methods. This is due to the regularity of the number of bilayers they have a much narrower range of diameters. With a length of 250 microns and a diameter of 0.5 micron, an aspect ratio of 500:1 is easily obtained. Furthermore, previous methods have resulted in distribution ranges of metallic microtubules that average less than 10 microns in length once metallized. This results in low aspect ratio. Utilization of the method according to this invention has resulted in microtubules which have been observed to average 70 microns in length when metallized.

The number of bilayers in the wall of the tubule was measured using a transmission electron microscope (Zeiss 100). The tubule samples were stained with uranyl acetate which adsorbs preferentially to the polar region of the bilayer. As a result the bilayers, when viewed under high magnification (>100,000×), appear in the transmission electron micrograph as alternately dark and bright parallel lines. Then the number of bilayers in the wall of the tubule can be determined by simply counting the number of bright lines present. The number can also be measured by circular dichroism (CD) spectroscopy.

The tubule formation process has been studied with circular dichroism (CD). This analytical technique is described by L. Velluz et al in "Optical Circular Dichroism. Principles, Measurements and Applications" (Verlag Chemie, Weinheim) 1965. The CD spectra of $DC_{8,9}GPC$ tubules in methanol/water (7:3) shows an interesting concentration dependence. The ratio of the ellipticity at 205 nm to that at 195 nm changes with the lipid concentration is shown in FIG. 1.

Figure 2:
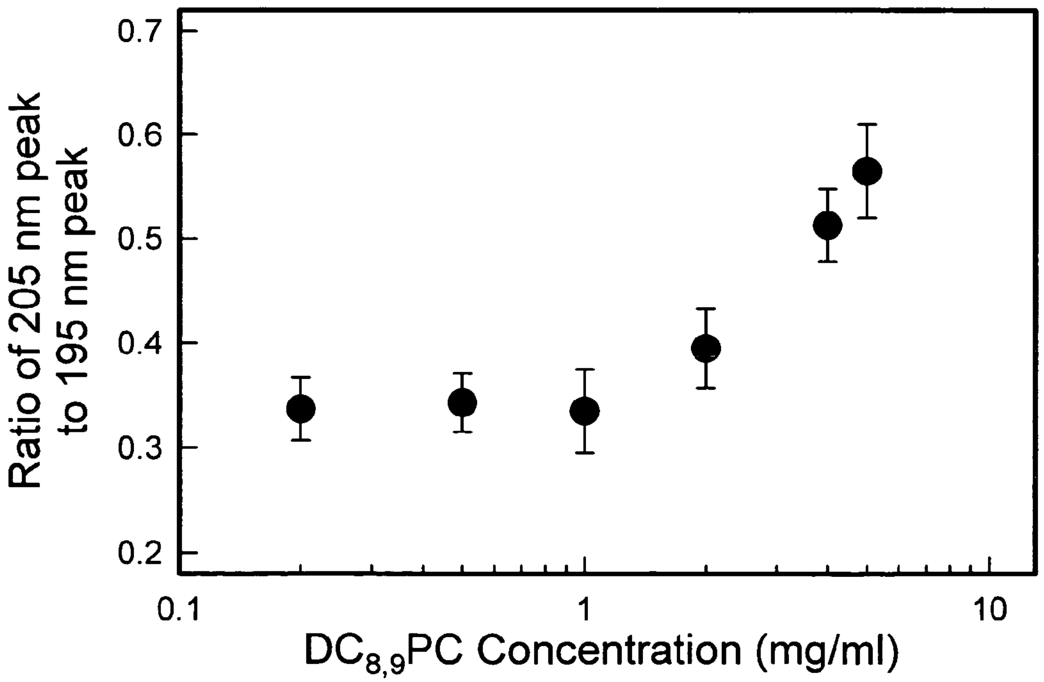
FIG. 2 is a graph showing the ratio of the spectral intensities at 205 nm and 195 nm.

FIG. 1 shows a comparison of the CD spectra at 25° C. of methanol/water tubules prepared with different lipid concentrations. The molar ellipticity of the 4 mg/ml $DC_{8,9}PC$ tubules is almost 50% greater than the 1 mg/ml sample at 205 nm, while the spectra are nearly identical below 200 nm. The ratio of the spectral intensity of the 205 nm to the 195 nm band as a function of the lipid concentration is shown in FIG. 2. Up to about 1 mg/ml the ratio is constant, while it begins to increase above this concentration. This is attributed to the tubules becoming more multilamellar as the concentration of lipid is increased. This was confirmed by electron microscopy. It has been as a result of the fundamental understanding of the formation process gained by these circular dichroism studies that it became clear that by varying the concentration of lipid in a methanol/water solution and then cooling it that the number of bilayers could be rationally controlled.

Experimental Conditions

The lipid 1,2 bis(tricosa-10,12-diynoyl)-sn-glycero-3-phosphocholine ($DC_{8,9}PC$) was purchased from Avanti Polar Lipids and recrystallized in acetone. The samples for UV absorption measurements were made by dissolving the lipid in spectroscopic grade solvents (Aldrich). For the CD studies, the tubules were prepared by dissolving $DC_{8,9}PC$ in the appropriate alcohol and mixing with water at 55° C. On slowly cooling the mixture through the lipid chain melting temperature (~37° C.), tubules are formed. The UV absorption measurements were performed using a CARY dual-beam spectrometer operating at room temperature. The CD studies were performed on a Jasco J-720 spectropolarimeter operating between 175 and 700 mm. The samples were placed in water-jacketed quartz cells with path lengths of 0.1, 0.2, or 1.0 mm. Temperature control was provided by a water circulator which provided thermal stability of about 0.2° C. The spectrometer was calibrated with ammonium-d-camphorsulfonate ($[\Theta]_{291}$=7910 deg $cm^2$/dmol) and D-pantoyllactone ($[\Theta]_{291}$=−16140 in water, $[\Theta]_{223}$=−12420 in methanol). Variations in the placement and orientation of the sample showed that the CD spectrum was independent of birefringent and scattering effects. Samples for electron microscopy were negative stained using uranyl acetate to enhance the contrast. Observations were made using a transmission electron microscope (Zeiss EM-010) operating at 60 kV.

Having described the basic aspects of the invention, the following examples are given to illustrate specific embodiments thereof.

EXAMPLE 1

This example illustrates the production of microtubules according to the invention.

Eighty five liters of technical grade methanol is pre-filtered utilizing a 5 micron porous polymer membrane filter and then fine filtered utilizing a 0.22 micron pore size membrane filter to remove any particulate materials as is a further 15 liters of deionized water.

Five liters of the methanol is then removed to solubilize the lipid, and the remainder is charged into a stainless steel or glass temperature controlled vessel and heated with constant agitation to between 45° C. and 50° C.

Five liters of the methanol is heated to 50° C. and a selected quantity of the lipid 1,2 bis(tricosa-10,12-diynoyl)-sn-glycero-3-phosphocholine ($DC_{8,9}PC$) is added to the mixture sufficient that the final ratio of chemically pure lipid is at a ratio of 5 gm/l in the final mixture. Thus in this example if 100% pure it would be 500 grams total.

The lipid is fully solubilized until a clear solution is obtained. Following this step the resultant mixture is then filtered through a 0.22 micron membrane filter and added with agitation to the heated methanol and water solvent system.

The resulting mixture is allowed to blend by pumping or by use of a mechanical mixer for a sufficient amount of time to ensure full and homogenous mixing. A period of 30 minutes, for example, has been found acceptable.

Following this step the lipid/solvent is then allowed to cool in as homogenous a thermal environment as possible to a uniform temperature of 32° C. at a rate of change not to exceed 1° C. per hour where it is held until a very slight haze is observed in the solution. Then the temperature is lowered to between 15 and 20° C. until the solution is observed to become opaque and the viscosity increases until the mixture exhibits a pronounced viscoelastic property. This may take a period of 24 to 100 hours. When a very high yield of tubules is observed by microscopic analysis it is possible to then remove the excess methanol solution by dialysis against distilled water utilizing a 2,500 dalton cut off reverse osmosis membrane.

Following this step the tubules may be stored at 4° C. until further processing is possible.

In an effort to measure the amount of lipid that had not been consumed in the formation process, a dialysis bag with a 25,000 dalton molecular weight cut off was employed to remove any remaining alcohol and phospholipid from the tubule sample. Typically it has been observed that the lipid will rapidly leave solution when the alcohol is diluted 100:1 in 15–20° C. water at which time the presence of the lipid may be visually observed. Following the dialysis for each of 3 samples done to quantify the yield and structure of the microtubules by this method, no lipid structures were observed forming in the water phase. This was taken to confirm a >99% conversion factor for lipid into microcylinders. Each of the above samples was further examined by electron microscopy and further processing as in Example 2 to denote the ability of the sample to withstand the rigors of further processing.

Measured lengths were directly observed by light microscopy to average >250 microns in length.

EXAMPLE 2

This example illustrates the metallic coating of microtubules made according to the invention.

The microtubules may be immediately dialyzed against 0.1N HCl until it is observed that they have reached a pH of 1.5. Following this step the microtubules are allowed to settle by gravity. Excess water is removed and the resulting volume is determined.

A commercial palladium-tin catalyst solution is added (Shipley Co. Cataposit 44) at a rate of 6 volumes of the full strength catalyst solution to 1 volume of the microtubules. The catalyst is observed to bind to the microtubules and then the resulting tubules and bound catalyst is observed to settle as the resultant specific gravity increases. To remove all unbound catalyst and acidic salt solution that makes up the commercial bath, the excess bath is removed and a pH 1.0 water solution is added and the tubules allowed to resettle. This is followed by a minimum of 3 more changes of water until the pH of the water/tubule solution is observed to reach pH 5.5.

Electroless plating may be conducted with a solution of a commercial plating bath such as Cuposit or Niposit (Shipley Co.) or a laboratory formulated bath. The finished electroless metal bath is added to the catalyzed microstructures at a ratio of 1:1 to 5:1. A preferred ratio for the Cuposit 324 bath is 3:1. Following the plating reaction the microcylinders are then rinsed to remove the excess bath and kept in an oxygen free environment until use is desired.

EXAMPLE 3

This example illustrates another process for electroless plating of the tubules.

The microcylinders may be pretreated by one of the two following methods. First a solution of 0.1N HCl is introduced to the tubule suspension just sufficient to lower the pH to 1.5 pH. Or, as an alternative, a solution of acidic salts such as Cataposit 444 may be used at the rate of 220 g/liter of distilled water until a pH of 1.5–2.0 is achieved. Following this pretreatment step a commercial catalyst system is introduced such as Cataposit 44 made by the Shipley Co. at the recommended formulation such that the final amount of catalyst exceeds the amount of lipid suspension by a ratio of 6:1. The catalyst will be observed to bind to the microcylinders and increase their specific gravity, at which time they will settle due to increased density. Following this treatment the catalyzed microcylinders are rinsed with at least 4 changes of water until all excess unbound catalyst and acidic salts are removed from solution. The pH of the resultant suspension in water is increased to the published value for the electroless deposition bath such as a pH of 8.0 with NaOH or KOH.

The electroless deposition bath is then mixed according to the manufacturer's published methods and added to the catalyzed microcylinders such that the volumetric ratio of catalyzed tubules is in a ratio of 6:1.

When the plating reaction has stopped and the microcylinders consist of metallic walls deposited over the lipid template they are removed from solution for processing. If desired the lipid may be removed for reprocessing with a hot methanol rinse.

EXAMPLE 4

This example illustrates the manufacture of multiple coatings of a polysaccharide.

Electrostatic binding of a polysaccharide such as sodium alginate or chitosan is possible to the microtubules. This is accomplished by suspending the fully formed lipid microtubule in a suspension of the solubilized polysaccharide such that the final concentration of the polysaccharide is in the range of 0.25 to 2.5% in solution where the concentration of lipid tubules to water is in the range of 0.5 to 2.5% by weight. Following incubation of the lipid tubules with the polysaccharide for at least an hour with very, very gentle agitation, the tubules are then centrifuged or filtered to remove the excess unbound polysaccharide. This step may be repeated. Once this layer is electrostatically bound to the surface it may be crosslinked with a calcium solution to form a polymer in the case of alginate or treated with an amine such as spermine to cross link the chitosan.

The resulting coating may then be electrostatically bound to a dissimilar charged polysaccharide such as chitosan over alginate or alginate over chitosan. This would result in a more robust and stabilized microtubule which is better able to withstand mechanical agitation.

Alternatively, a metal coating could be bound to the chitosan layer by adding the catalyst as in the example of the electroless plating the lipid microstructures. This offers the advantage of being able to remove the lipid that comprises the bilayer where it has been shielded from reaction with the catalyst. This recovery of lipid is achieved by warm solvent extraction of the lipid from the metallic microstructures and is enhanced by the overcoat of chitosan which will bind the catalytic salt and permit over coating with metal.

EXAMPLE 5

This example illustrates a method for producing multiple bilayer tubules.

A temperature controlled reaction vessel is filled with a mixed alcohol (methanol) and water mixed solvent system such that it contains 75 parts by volume methanol and 15 parts water and heated to at least 5° C. above the lipid transition temperature which is typically 45° C. to 50° C. A further 10 parts alcohol (methanol) is heated as above and a quantity of lipid is dissolved by stirring to yield 8–10 mg/ml of the final mixture. This amount is larger than the 5 mg.ml used for just making 2 bilayers. When dissolved it is filtered through a 0.22 micron filter.

The temperature is lowered to the transition temperature of the lipid and held till tubule formation is observed. It is then lowered at a rate of 1° C. per minute to ambient temperature or at least 20–25° C. The tubules formed have more than just 2 bilayers. Following formation, the tubules are preferably stored at a temperature of about 4° C., although they can be stored at any temperature which is below their transition temperature.

It is understood that the foregoing detailed description is given merely by way of illustration and that many variations may be made therein without departing from the spirit of this invention.

What is claimed is:

1. A method for controlling the wall thickness of lipid microtubules formed by cooling a heated methanol-water mixture containing the dissolved lipid comprising the steps:

(a) selecting a methanol-water system to be used which is characterized by a volume ratio of methanol and water that totals 100 volume percent, wherein the methanol and water are first filtered to remove any particulates and wherein the filter is at least as fine as a 0.22 micron filter;

(b) determining the amount of lipid to be used for the solvent system selected in step (a) so as to produce the desired wall thickness of the microtubule;

(c) dissolving the determined amount of lipid from step (b) into a portion of the methanol which has been heated to a temperature above the transition temperature for the lipid to form a clear solution;

(d) adding the heated methanol lipid solution of step (c) into a mixture of the remaining methanol and water as selected in step (a) which has been heated to a comparable temperature above the transition temperature for the lipid as in step (c) so that the total amount of methanol and water is in the desired amount selected in step (a); and (e) cooling the heated mixture in step (d) slowly to permit the formation of microtubules with a controlled, uniform number of bilayers.

2. A method according to claim 1, wherein after the lipid is dissolved in the heated methanol in step (c) the clear solution is filtered to remove particulates.

3. A method according to claim 1, wherein after the clear solution of step (c) is added to the heated methanol-water mixture in step (d), the resulting mixture is agitated to form a homogeneous mixture.

4. A method according to claim 1, wherein the wall thickness is just 2 bilayers.

5. A method according to claim 1, wherein the wall thickness is at least 2 bilayers.

6. A method according to claim 1, wherein the volume ratio of methanol to water varies from about 98:2 to 40:60.

7. A method according to claim 6, wherein the volume ratio of methanol to water varies from about 90:10 to 70:30.

8. A method according to claim 1, wherein the volume ratio of methanol to water varies from about 87:13 to 80:20.

9. A method according to claim 1, wherein the lipid concentration in step (b) is about 2 mg/cm$^3$ or greater.

10. A method according to claim 4, wherein the methanol to water volume ratio in step (a) varies from about 70:30 to 85:15 and the lipid concentration in step (b) varies from about greater than 2 mg/cm$^3$ to less than or equal to 5 mg/cm$^3$ respectively.

11. A method according to claim 1, wherein the heated mixture in step (d) is cooled at a rate not to exceed 10° C./hour.

12. A method according to claim 1, wherein the heated mixture in step (d) is cooled at a rate not to exceed 1° C./hour.

13. A method according to claim 12, wherein the cooling takes place for 30 minutes to 120 hours to form tubule structures.

14. A method according to claim 1, wherein the lipid is selected from the group consisting of tubular forming lipid/surfactants.

15. A method according to claim 14, wherein the lipid is selected from diacetylenic phosphochlolines having hydrocarbon chains of 15 to 27 carbons each.

16. A method according to claim 15, wherein the lipid is 1,2 bis(tricosa-10,12-diynoyl)-sn-glycero-3-phosphocholine ($DC_{8,9}PC$).

17. A method according to claim 1, wherein the yield for the manufacture of microtubules from the lipid is greater than 90%.

18. A method according to claim 17, wherein the yield for the manufacture of microtubules from the lipid is greater than 95%.

19. A method according to claim 1, wherein the mixture of the remaining heated methanol and water in step (d) is made homogeneous prior to adding the lipid from step (c).

20. A method according to claim 1, comprising the steps of (a) filtering the methanol and water before use to remove any particulates;

(b) filtering the clear solution after the lipid is dissolved in the heated methanol in step (c) to remove particulates;

(c) agitating the mixture of the remaining heated methanol and water in step (d) prior to adding the lipid from step (c); and (d) agitating the resulting mixture of the clear solution of step (c) that has been added to the heated methanol-water mixture in step (d) to form a homogeneous mixture.

21. A method according to claim 18, wherein the yield for the manufacture of microtubules from the lipid is greater than 98%.

* * * * *